Figure 1:
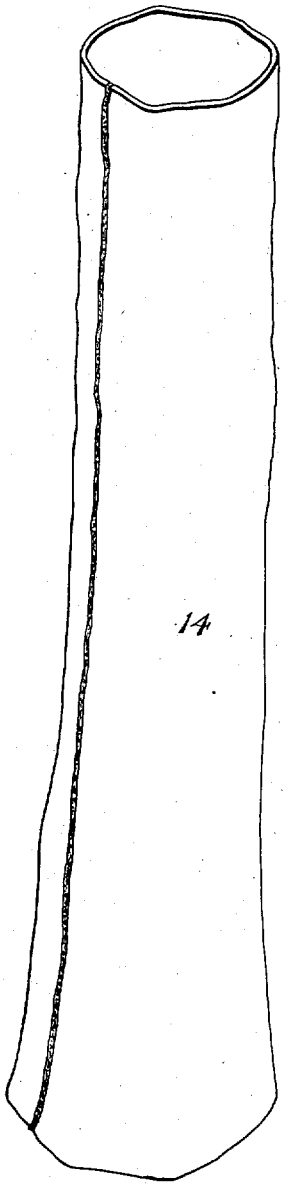

Nov. 24, 1931.

C. A. FRAHM ET AL

SHEET METAL SHAFT

Original Filed Jan. 25, 1928

Re. 18,258

4 Sheets-Sheet 1

Inventors

Carl A. Frahm

E. W. Riemenschneider

By Frease and Bond

Attorneys

C. A. FRAHM ET AL

Nov. 24, 1931.

SHEET METAL SHAFT

Original Filed Jan. 25, 1928

Re. 18,258

4 Sheets-Sheet 2

Inventors

Carl A. Frahm

E. W. Riemenschneider

By Fraser and Bond

Attorneys

C. A. FRAHM ET AL

Nov. 24, 1931.

SHEET METAL SHAFT

Original Filed Jan. 25, 1928

Re. 18,258

4 Sheets-Sheet 3

Inventors

Carl A. Frahm

E. W. Riemenschneider

By Frease and Bond Attorneys

C. A. FRAHM ET AL

Nov. 24, 1931.

SHEET METAL SHAFT

Original Filed Jan. 25, 1928

Re. 18,258

4 Sheets-Sheet 4

Inventors

Carl A. Frahm

E. W. Riemenschneider

By Frease and Bond

Attorneys

Reissued Nov. 24, 1931 Re. 18,258

UNITED STATES PATENT OFFICE

CARL A. FRAHM AND EDMUND W. RIEMENSCHNEIDER, OF CANTON, OHIO, ASSIGNORS TO THE UNION METAL MANUFACTURING COMPANY, OF CANTON, OHIO, A CORPORATION OF OHIO

SHEET METAL SHAFT

Original application filed January 25, 1928, Serial No. 249,353. Divided and application filed February 13, 1928, Serial No. 253,949. Original No. 1,789,972, dated January 27, 1931. Application for reissue filed July 16, 1931. Serial No. 551,270.

The invention relates to hollow shafts made of metal rolled into sheets, strips or plates, and adapted for use in columns and as pillars, posts, poles, standards and the like; including shafts of this character which are corrugated or fluted to increase the strength of the same, as shown in the Numan Patents No. 838,571 of December 18, 1906, and No. 888,114 of May 19, 1908.

The present application is a continuation in part of the common subject matter set forth in the applications of Carl A. Frahm, filed September 9, 1926, Serial No. 134,394, and of Edmund W. Riemenschneider, filed December 30, 1926, Serial No. 157,981; and this application is a division of our parent application for patent for improvements in sheet metal shafts and method of making same, filed January 25, 1928, Serial No. 249,353, matured in Letters Patent No. 1,777,080, dated September 30, 1930; and the object of the present improvement is to increase the strength of shafts of this character when made of rolled metal sheets, strips or plates, hereinafter referred to collectively as sheet metal; and the general object of the present improvement is to produce a sheet metal shaft having a greater strength against compressing, bending, flexing and tortional strains than has heretofore been attained, the shaft being especially adapted for use as telegraph, telephone, transmission or trolley poles, having greater strength and being lighter in weight and neater in appearance than poles at present in use for such purposes.

In the manufacture of fluted sheet metal shafts, the metal has been merely bent laterally over the ribs of a mandrel to form the fillets and flutes in the shaft, without changing the thickness of the sheet metal at any point, and without materially increasing the elastic limit of the metal beyond the normal strength of the same in the sheet from which the shaft is made.

Although sheet metal shafts made in this manner are strengthened to a certain extent by corrugations or flutes formed by bending the metal, it has been found in actual practice and by tests, that when subjected to strains or blows, such shafts will invariably bend or buckle inward more readily than similar shafts having sharp edged fillets between the flutes; and by a mere bending of the sheet to form flutes or fillets, it has been commercially impossible to uniformly obtain an architecturally correct outline in the shaft, or to produce the sharp corners or edges in the fillets which is essential in Doric and in Ionic or Corinthian columns; these detrimental characteristics becoming more apparent and exaggerated as the thickness of sheet used is increased.

Beginning with the formation of a tubular shaft, the present invention includes a compression, as by cold rolling, of the sheet or plate metal wall of the shaft so as to change the molecular arrangement of the metal and increase the elastic limit thereof.

Also, the formation of flutes and fillets by a swaging and flowing compression of the metal, as by cold rolling, which displaces the metal in certain places, forms sharp edges in the fillets and changes the molecular arrangement of the metal; so as to increase the strength of the fillets not only by an increased thickness of the metal, but by an increase in the elastic limit thereof in the region of the fillets.

Moreover, the compressing or cold rolling operation straightens any longitudinal camber or bends and any circular imperfections there may be in the contour of the tubular shaft, and sets the molecular arrangement of the metal in the same so that a finished shaft may be split longitudinally and each half will hold its shape for matching and being readily joined to the other half, which cannot be done by a shaft formed merely by bending operations.

A fluting machine of the type set forth in the Frahm Patent No. 1,605,628 of November 2, 1926, when properly modified and operated in the manner described in said parent application, may be used in making the improved shaft, as illustrated in the accompanying drawings forming part hereof, in which—

Figure 2:
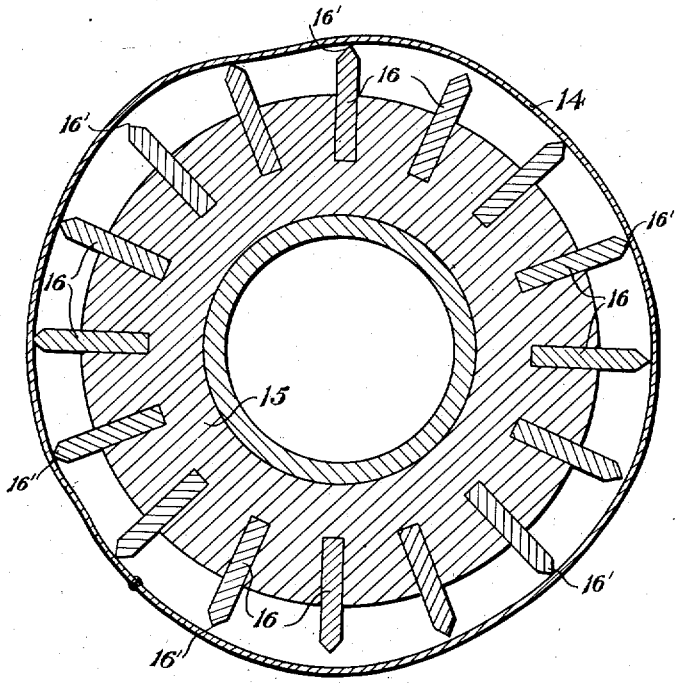
Figure 3:
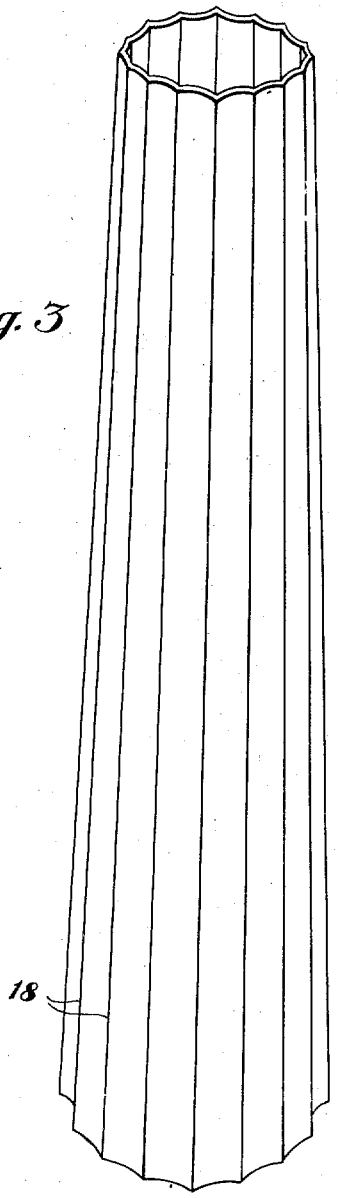
Figure 4:
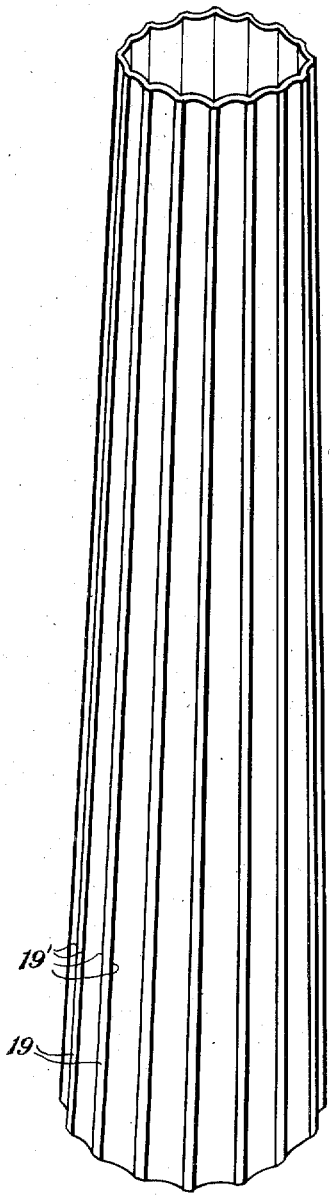
Figure 5:
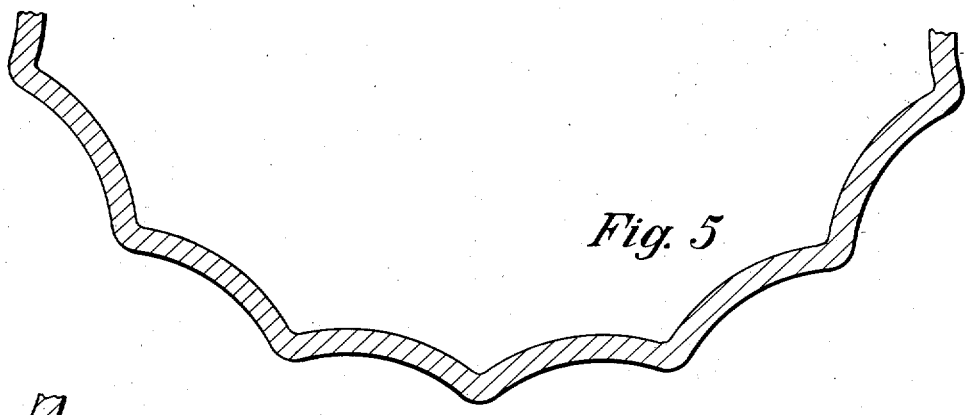
Figure 6:
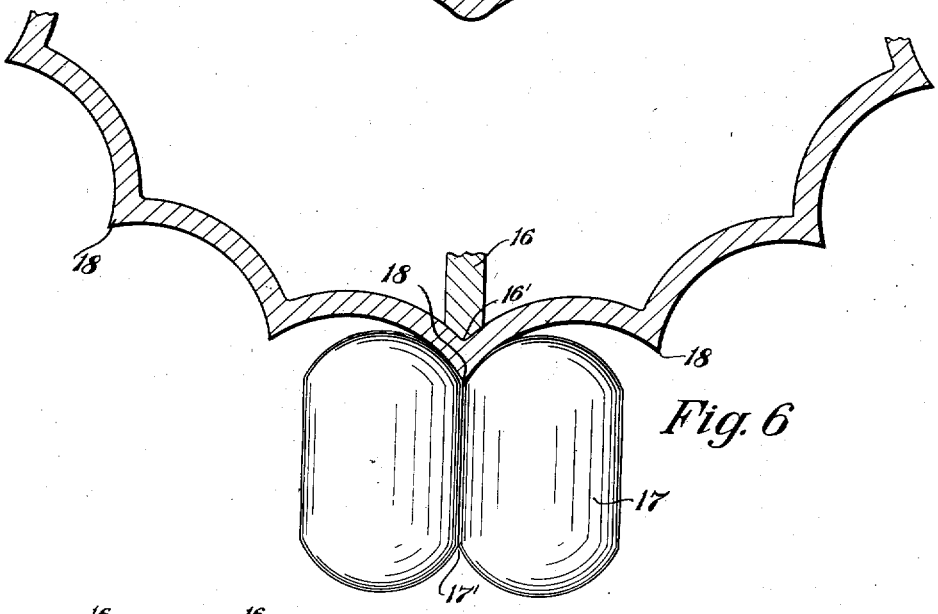
Figure 11:
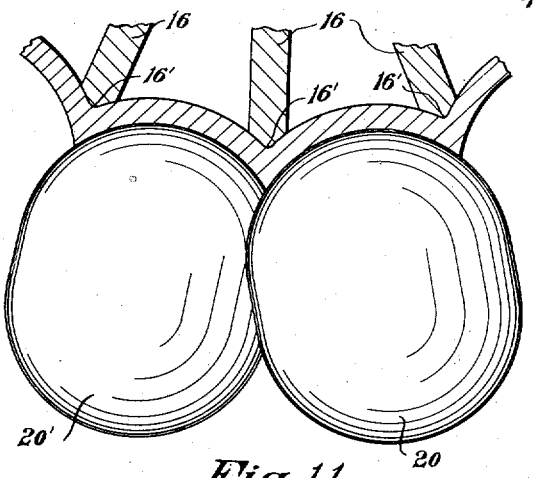
Figure 7:
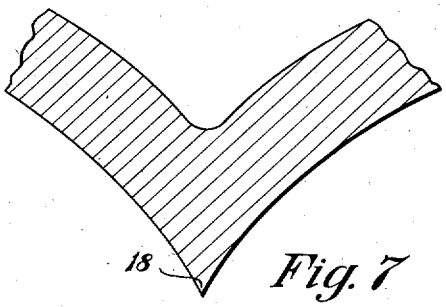
Figure 8:
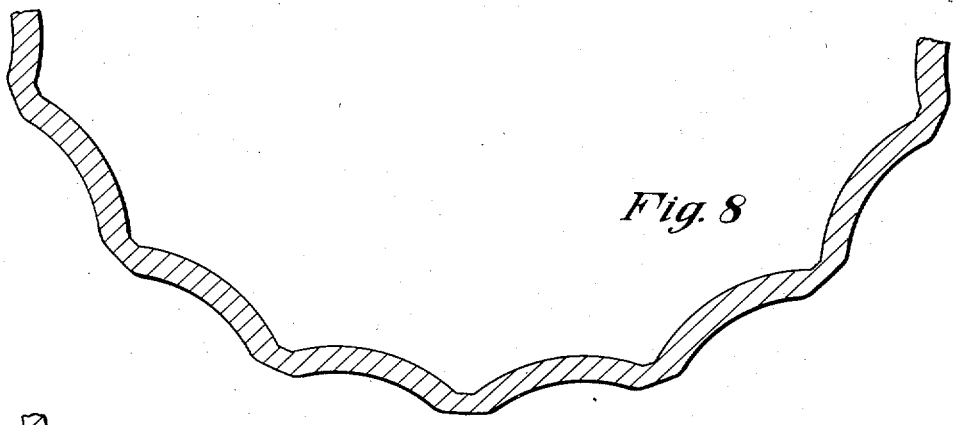
Figure 9:
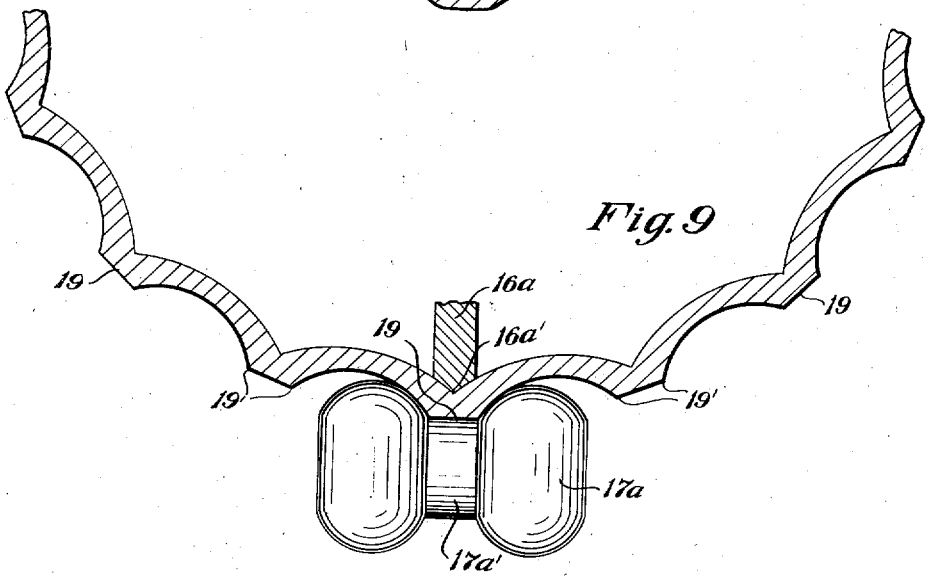
Figure 10:
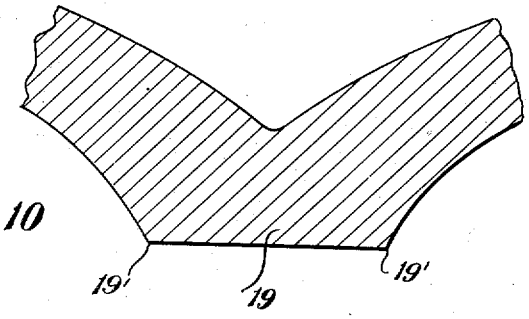

Figure 1 is a perspective view of a portion of a tapered tubular shaft from which a fluted shaft may be made;

Fig. 2, a cross section through a mandrel, showing the tubular shaft positioned thereon for a cold rolling and fluting operation;

Fig. 3, a perspective view of a fluted shaft of the Doric order, embodying the invention;

Fig. 4, a similar view of an Ionic or Corinthian shaft;

Fig. 5, an enlarged transverse section through a portion of an ordinary fluted tubular shaft of the Doric order, made by the ordinary bending method;

Fig. 6, a similar view illustrating the method of making fillets in the improved shaft of the Doric type, by cold rolling and extruding the metal for increasing the thickness at the angles and sharpening the same;

Fig. 7, a fragmentary enlarged section, showing details of an improved fillet of the Doric type;

Fig. 8, a similar view of an ordinary fluted shaft of the Ionic or Corinthian order, made by the ordinary bending method;

Fig. 9, a similar view illustrating the method of making fillets in the improved shaft of the Ionic or Corinthian type, by cold rolling and extruding the metal for increasing the thickness at the angles and sharpening the same;

Fig. 10, a fragmentary enlarged section showing details of the improved fillet of the Ionic or Corinthian type; and Fig. 11, a fragmentary transverse section through the mandrel and shaft, showing one manner of finishing the formation of the flutes by rolls.

Similar numerals refer to similar parts throughout the drawings.

When a tapered tubular shaft 14 is used, the same may be formed from a tapered blank or strip of sheet or plate metal by bending rolls and forming dies and edge welding means, as set forth in Riemenschneider's application for tubular column forming machine, filed August 30, 1926, Serial No. 132,369, matured in Letters Patent No. 1,765,384, dated June 24, 1930; and when so formed, the diameter of the tubular shaft may be and preferably is slightly larger than the diameter of the fillet forming ribs of the fluting mandrel, so as to give a circumferential fullness to be taken up and trued by the cold rolling and flute forming operations, as shown in Fig. 2.

When the fluting operations are performed by a machine of the type shown in said Frahm Patent No. 1,605,828, the mandrel body 15 is provided with a series of equally spaced steel die bars or ribs 16 or 16*a*, extending radially from the periphery of the body, and each rib may be provided with a substantially V-shaped outer edge 16′ or 16*a*′ for contact with the inner face of the tubular shaft 14, as shown in Figs. 6 and 9.

The mandrel with the tubular shaft mounted thereon as shown in Fig. 2, is moved one or more times endwise between a set or series of radially yielding rolls as 17 or 17*a*, shaped to form the desired outline of the fillets to be formed and arranged to bear upon the shaft at the points opposite corresponding die bars 16 or 16*a*, as shown in Figs. 6 and 9.

There may be, and usually are required to be, two sets or series of such fillet forming rolls arranged to operate upon alternate fillets, because there is not room enough to place all the rolls in a single stand; and these rolls may be and preferably are provided with sharp angle V-shaped annular grooves 17′ to produce the sharp edge fillets 18, as shown in Fig. 6, or may be provided with the flat bottom annular grooves 17*a*′ to produce the flat face fillets 19 with sharp edges 19′, as shown in Fig. 9.

Sufficient pressure is applied to the fillet forming rolls to displace or swage the metal in the fillets as the same passes through the rolls, and cause the metal to flow and extrude into the grooves of the rolls, to increase the thickness of the metal at that place and also form a sharp edge or sharp edges in the fillets.

The same operation cold rolls the metal in and adjacent to the fillets, and by changing the molecular arrangement of the same, increases its elastic limit and thereby increases the strength of the fillets as well as of the column, beyond that of a sheet metal column formed by merely bending the metal.

The same cold rolling operation also elongates the metal in the fillets and increases the length of the shaft to an extent which has been found in practice to be from one-half of one percent to four and a half percent longer than the original tubular shaft.

During the described operations upon the fillets, the sheet metal between them is partially formed into flutes, as shown in Fig. 6, and the metal therein being relatively softer than the cold rolled fillets, and being necessarily extended longitudinally by stretching to the extent of the increased length of the shaft, may also be stretched somewhat laterally in the formation of the flutes so as to slightly increase its elastic limit.

Whereupon the mandrel with the fillet formed shaft thereon is passed one or more times between another set or series of radially yielding rolls 20 and 20′, shaped to form the desired concavity of the flutes and bearing upon the shaft at and between adjacent fillet forming die bars or ribs 16, as shown in Fig. 11.

The action of these rolls not only stretches and shapes the flutes, but completes the action of the fillet forming rolls and sets the molecular arrangement of the metal and relieves the same of flexing strains, so that the shaft will hold its shape thus given, even though it may be severed longitudinally into two lateral halves.

Moreover, the same operations serve to straighten the tubular shaft longitudinally and to true its shape circumferentially, so that when the fluted shaft is removed longitudinally from the mandrel, it is a correctly formed and truely shaped straight shaft with sharp edge fillets of the type given to them by the fillet forming rolls.

The elongation of the shaft by the cold rolling operation is accompanied by the taking up of the circumferential fullness of the same to such an extent that after the fillets have been formed as described, the shaft fits the mandrel so tightly that it is difficult if not impossible to remove the shaft from the mandrel until after the stretching action of the flute forming rolls, which acts to loosen the shaft from the mandrel, so as to permit an endwise removal therefrom.

It has been found by actual tests that sheet metal shafts formed and fluted by the improved method described herein, have a greater strength and a greater limit of elasticity than any other known form of tubular shafts of considerably greater weight made by merely bending the sheet metal; and at the same time the shaft is formed with clean-cut sharp lines and with sharp edges on the fillets, thereby producing a shaft of architecturally correct outlines and appearance, which cannot be made by a bending formation.

It has also been found by actual tests that the increased thickness of the metal in the fillets, the extrusion of the metal in the sharp angles thereof, and the increased elastic limit of the metal in the region of the fillets, so greatly increases the ultimate strength of the improved shafts, over the strength of shafts fluted merely by bending, that they will bulge outward at a point of rupture and after rupture will stand a considerable loading, instead of bulging inward under strain or impact at a point of rupture in the manner common to all other known types of tubular shafts.

It has not been found possible, heretofore, to make fluted shafts from the thicker gauges of rolled metal, from 11 gauge and thicker, which are known to the trade as plate metal; because comparatively narrow fillets between relatively wide flutes, cannot be formed merely by a bending operation, upon a small enough radius to give any substantial semblance to an architectural fluted column.

In addition to that inhibition, the inability to make a fluted shaft from plate metal, solely by a bending operation, is because the metal is so thick that a mere bending stretches and reduces the thickness and may even rupture the metal itself, around the periphery of the fillet, so that, unless the same is accompanied by a swaging compression operation, such as is described herein, the shaft is weakened at the very place it should be strengthened, for use as a column or pole.

It is for these reasons that the swaging compression method of making tubular shafts, described and claimed in said parent Patent No. 1,777,080, has rendered it possible, for the first time, to make from plate metal, the tapered, fluted, tubular pole, which is described and claimed herein as a new article of manufacture.

It is not intended to limit the broad idea of cold rolling a tubular shaft to increase the strength thereof by increasing the elastic limit of the metal, to the formation of a fluted shaft, as set forth herein by way of illustration; it being evident that a cold rolling of an imperfectly shaped tubular shaft will serve not only to straighten the same longitudinally and true the same circumferentially by changing the molecular arrangement of the metal, but will also serve to strengthen the shaft by the resulting increase in the elastic limit of the metal.

Nor is it intended to limit the broad idea of compressing the metal with sufficient force to shape the fillets alone, or both the fillets and the flutes, and to swage and displace the metal in the fillets to cause it to flow and extrude a predetermined thickness and shape; to the cold rolling operations which are described herein for illustrating the preferred method of applying such pressure.

Nor is it intended to limit the scope of the invention to the tapered tubular shafts described herein by way of illustration, for obviously the broad idea of the improved method may be used as well for the production of tubular shafts without a taper, and to shafts having an entasis.

In the claims appended hereto, the expression "sheet metal" is intended to include strips and plates as well as sheets of metal, and the term "shaft" is intended to include pillars, posts, poles, standards, columns and the like.

We claim:—

1. A tubular shaft formed with flutes and fillets made of sheet metal, the metal in the metal in the fillets having higher elastic limit than the metal in the flutes.

2. A tubular shaft formed with flutes and fillets made of sheet metal, the metal being thicker in the region of the fillets than elsewhere.

3. A tubular shaft formed with flutes and fillets made of sheet metal, the thickness of the metal being greater in the fillets than in the flutes.

4. A tubular shaft formed with flutes and fillets made of sheet metal, the edges of the fillets being sharper than the edges of fillets formed merely by bending the metal.

5. A tubular shaft formed with flutes and fillets made of sheet metal, the thickness of the metal being greater in the fillets than in the flutes, and the edges of the fillets being sharper than the edges of fillets formed merely by bending the metal.

6. A tubular shaft formed with flutes and fillets made of sheet metal, the thickness of the metal being greater in the fillets than in the flutes, and the metal in the flutes having higher than the normal elastic limit inherent in fillets formed merely by bending the metal.

7. A tubular shaft formed with flutes and fillets made of sheet metal, the thickness of the metal being greater in the fillets than in the flutes, the metal in the fillets having higher than the normal elastic limit inherent in fillets formed merely by bending the metal, and the edges of the fillets being sharper than the edges of fillets formed merely by bending the metal.

8. A tubular shaft with flutes and fillets made of sheet metal, in which the molecular arrangement of the metal in the region of the fillets is changed from the arrangement inherent in the sheet from which it is made, and the elastic limit of the metal in the region of the fillets is higher than the elastic limit inherent in said sheet when the fillets are made merely by bending the metal.

9. A tubular shaft formed with flutes and fillets made of sheet metal, in which the molecular arrangement of the metal in the fillets is changed from the arrangement inherent in the sheet from which it is made, and the elastic limit of the metal in the fillets is higher than the elastic limit inherent in said sheet when the fillets are formed merely by bending the metal.

10. A fluted, tubular shaft having swaged compression formed fillets in a wall of varying thickness made of plate metal of 11 gauge and thicker.

11. A fluted, tubular shaft having swaged compression formed fillets in a wall made of plate metal of 11 gauge and thicker.

12. A tapered, fluted, tubular pole made of plate metal of 11 gauge and thicker with swaged compression formed fillets.

CARL A. FRAHM.
EDMUND W. RIEMENSCHNEIDER.